April 1, 1958 — J. MACATICIAN ET AL — 2,829,185
BORE SURFACE THERMOCOUPLE
Filed Sept. 9, 1955 — 2 Sheets-Sheet 1

INVENTORS
JOHN MACATICIAN
JACOB NANIGIAN

April 1, 1958 J. MACATICIAN ET AL 2,829,185
BORE SURFACE THERMOCOUPLE
Filed Sept. 9, 1955 2 Sheets-Sheet 2
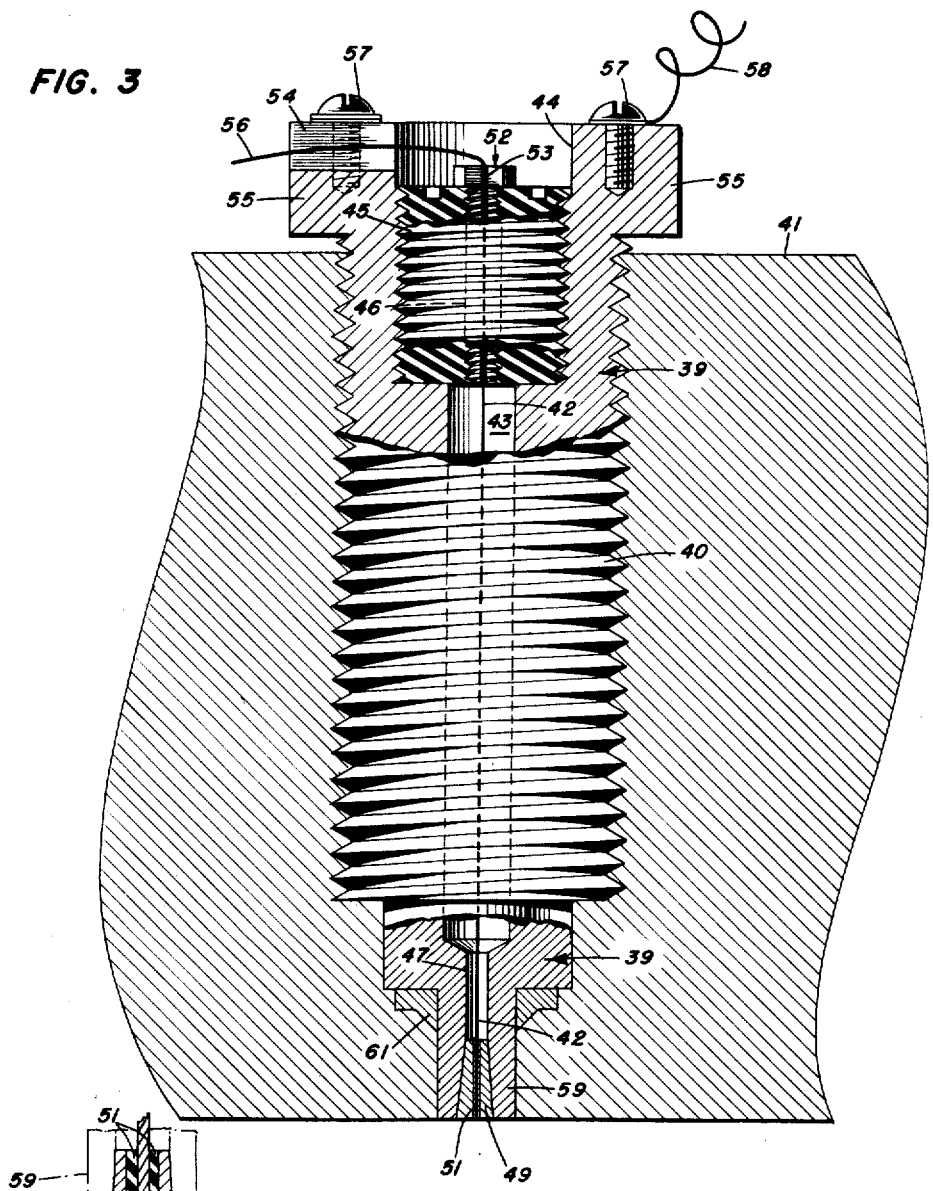
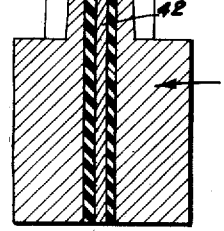
INVENTORS
JOHN MACATICIAN
JACOB NANIGIAN
BY *G. D. O'Brien*
*Q. Baxter Warner* ATTORNEYS United States Patent Office

2,829,185
Patented Apr. 1, 1958

2,829,185

BORE SURFACE THERMOCOUPLE

John Macatician, Landing, N. J., and Jacob Nanigian, Indian Head, Md.

Application September 9, 1955, Serial No. 533,532

12 Claims. (Cl. 136—4)

(Granted under Title 35, U. S. Code (1952), sec. 266)

The invention described herein may be manufactured and used by or for the Government of the United States of America for governmental purposes without the payment of any royalties thereon or therefor.

This invention relates to a bore surface thermocouple and more particularly to a bore surface thermocouple for recording transient temperatures at the bore surface of guns.

Heretofore, attempts have been made to determine the temperatures reached by the bore surface of guns by means of a thermocouple placed at the bore surface. A major problem inherent in this method has been to locate the thermal junction directly at the bore surface, and yet have the junction withstand the abrasive action of the gas and the high pressures occurring in the gun tube. A secondary problem has been to insert the thermocouple into the bore without substantially disturbing the normal flow of heat into the barrel. Although thermocouples have been designed for use in measuring transient temperatures of a gun bore, it has been found that these were limited in use to small caliber barrels, such as machine gun barrels, and would fail to function under the heat and pressure created in large caliber guns.

An object of the present invention is to provide a thermocouple capable of recording accurately the bore surface temperatures of large and small caliber guns.

Another object is the provision of a thermocouple having a metallic composition with a thermal conductivity which closely approaches that of gun steel in order that normal heat flow from the bore surface into the gun barrel is not materially affected.

Another object is the provision of a bore surface thermocouple constructed such that it may withstand high pressure and heat incident with the firing of large caliber guns.

A further object is to provide a thermocouple having elements so arranged as to permit insertion through an opening in a gun barrel wall and a mating therewith firmly in a gas-tight relationship.

Still another object is the provision of a bore surface thermocouple which requires a minimum of electrical insulation in order that a heat reservoir of high capacity may not be introduced.

A further object is to provide a thermocouple the bimetallic elements of which are selected to have an extended life even in the environment of the high temperatures involved in large caliber guns and especially under repeated usage.

Other objects and many of the attendant advantages of this invention will be readily appreciated as the same becomes better understood by reference to the following detailed description when considered in connection with the accompanying drawings wherein:

Fig. 3 is an elevational view, partly in section, of a modification of the device; and Fig. 4 is an enlarged sectional view of an anvil, a portion of which is shown in assembled thermocouple position in Fig. 3.

Figure 1:
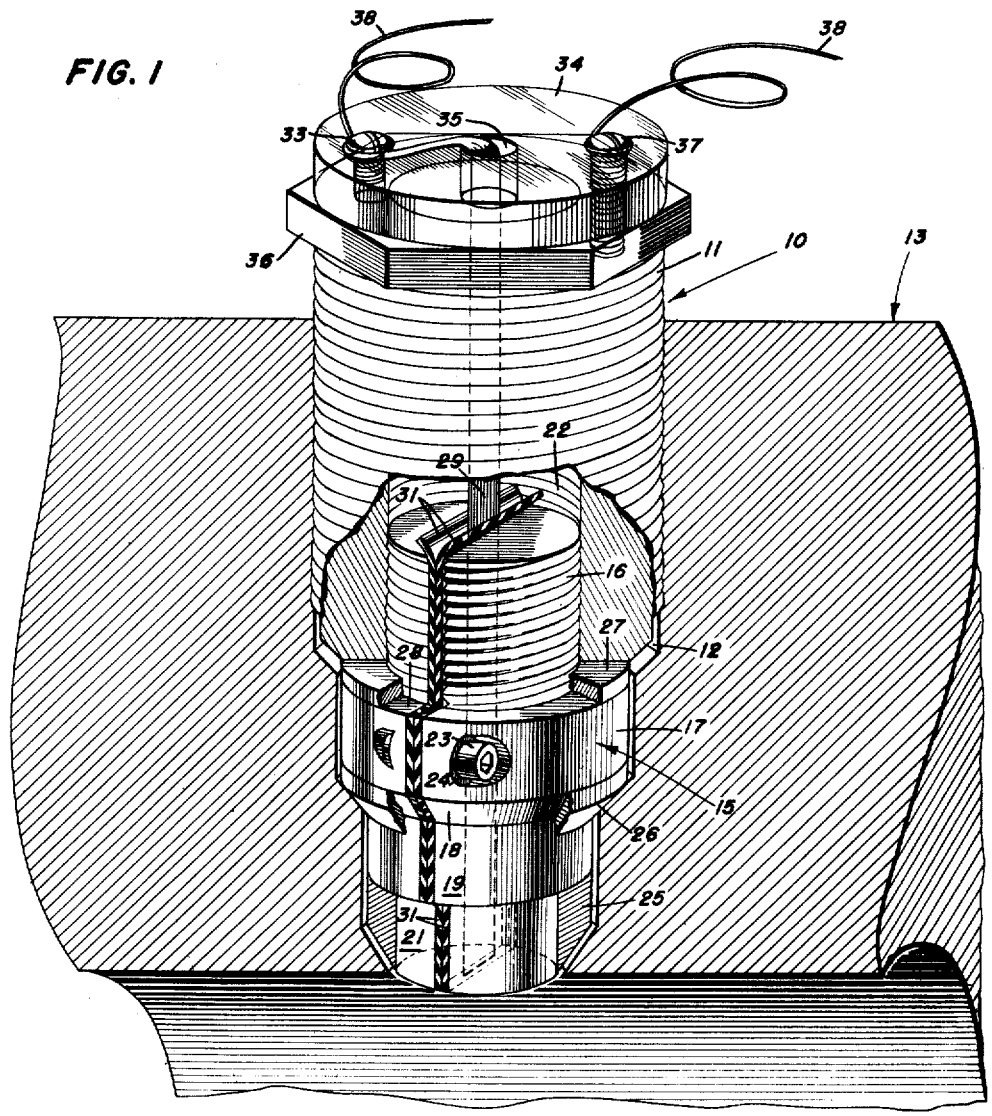
Fig. 1 shows an elevational perspective view, partly in section, of an embodiment of the invention mounted in a gun barrel.

Referring now to the drawings, wherein like reference characters designate like or corresponding parts throughout the several views, there is shown in Fig. 1, which illustrates a preferred embodiment, a cyindrical thermocouple housing 10 threadedly engaged by means such as external threads 11 in an opening 12 provided in a gun barrel 13, the opening 12 extending from the exterior of barrel 13 substantially perpendicularly to the gun bore axis and communicating with the interior or bore of barrel 13. A preassembled thermocouple element 15 having a reduced threaded portion 16 extending to form an annular medial flange 17 with a downwardly and inwardly tapered lower side 18 leading to a cylindrical portion 19 and terminating in a reduced diameter lower cylindrical portion 21 is threadedly received into a longitudinally extending tapped passage 22 formed in housing 10. For practical fabrication thermocouple element 15 may be manufactured in two longitudinally divided symmetrical parts which may be clamped together by suitable means such as Allen screws 23 receivable into transversely directed recessed threaded openings 24 provided in annular medial flange 17 of element 15. At lower cylindrical portion 21 the thermocouple element 15 is fixedly held together by means such as a soft steel ring 25 press-fitted thereon and having an external beveled contour.

A gas seal 26 is frictionally mounted on the tapered lower side 18 of annular flange 17, and a seating gasket 27 preferably composed of soft steel material may be loosely positioned on the upper horizontal surface 28 of flange 17 to function as both a gas seal and a limit stop between the thermocouple element 15 and housing 10 as element 15 is threaded into passage 22 to achieve a stable coupling between these elements in order to withstand pressure forces without changing their positions relative to one another.

The bimetallic elements of the bore thermocouple are a thin nickel ribbon 29, and the steel of the housing 10 and thermocouple element 15. The preferred steel is that which has a heat conductivity closely paralleling the heat conductivity of the gun barrel steel. By this selection normal heat flow from the bore surface through the barrel is undisturbed and in turn enables the thermocouple recorded temperatures to approximate the true temperatures witnessed by the barrel.

Nickel ribbon 29 is firmly held between the symmetrical parts of element 15 by Allen screws 23 and ring 25 along the longitudinal center line of the assembled element 15, and is electricaly insulated therefrom by suitable means such as mica sheets 31 between which the ribbon 29 is sandwiched.

Figure 2:
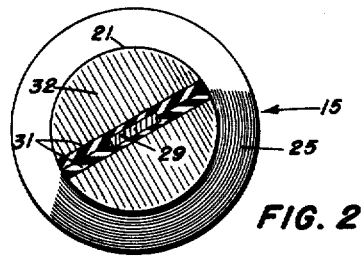
Fig. 2 illustrates a bottom view of the bore face of the thermocouple shown in Fig. 1.

As best shown in Fig. 2, the bore surface 32 of element 15 serves as the sensing tip of the thermocouple by the provision of the nickel ribbon 29 and the steel of element 15 at a common junction. The steel and the nickel are slowly ground perpendicularly to the division line between parts of element 15 such that a homogenous surface 32 of microgrooves of the two metals is achieved as well as a strong mechanical bond between the two dissimilar metals affording a sensing tip with a prolonged period of possible use at high temperatures and pressures. The junction formed in this way is referred to herein as a "ground weld." Surprisingly, an examination of this "ground weld" shows metal particles bridged across the surface of the insulation so as to form a thermojunction.

Nickel ribbon 29 is suspended through the central passage 22 of housing 10 and attached to a terminal screw 33 which is electrically insulated from the metal of housing 10 and hence element 15 by means of an insulation cap 34. Terminal screw 33 is of a shorter length than the thickness of insulating cap 34. Cap 34, preferably formed of Plexiglas insulation, contains a centrally located opening 35 which may be axially aligned with passage 22 of housing 10 in order that ribbon 29 may be connected to terminal screw 33 and continued in a suspended insulated position to pass through the mica sheet insulation 31 of element 15 to arrive at the thermocouple junction at the bore surface 32 of element 15. Housing 10 may be provided at its upper end with a suitable tool engaging head such as hexagonal head 36 upon which the cap 34 may be conveniently supported. A second terminal screw 37 may be employed to electrically couple the steel of the housing 10 and element 15. Suitable wiring such as copper wire leads 38 is connected to terminal screws 33 and 37 to convey the electromotive forces created by the thermocouple to amplifiers and related indicating instruments (not shown).

Mica sheets 31 of element 15 are specially prepared for use in the thermocouple by first soaking a sheet of mica for twenty-four hours in a tank of water containing a wetting agent. By the end of this period the edges of the mica sheet should become ruffled, and the laminae of the mica sheet may be separated from one another by inserting a needle point between the ruffled edges created by the soaking step. The individual mica laminations are floated on the water surface, and by placing a sheet of glass beneath the floated laminations they may be removed from the water and allowed to dry. The mica is then peeled away from the glass and in this condition is ready for placement in the thermocouple to result in a total thickness of approximately 3 to 10 microns between the symmetrical parts of element 15.

A modification of the bore surface thermocouple of Fig. 1 is illustrated in Fig. 3 wherein a thermocouple cylindrical housing 39 having external threads 40 provided to mate with corresponding threads tapped in gun barrel 41 in a passage provided through the barrel wall to the gun bore. Thin nickel ribbon 42 and the housing metal form the two thermocouple dissimilar metals. The housing 39 is provided with a central opening 43 which is enlarged at the upper portion 44 to threadedly receive an insulating plug 45 which also has a central passage 46 extending longitudinally therethrough coaxially with opening 43. Central opening 43 is diminished in diameter at its lower portion 47 into which is force fitted an anvil 48, Fig. 4, formed in two equal and symmetrical parts. The lower portion 47 of opening 43 is also provided with a downwardly directed progressively increasing diameter for wedging engagement with rod-like protuberance 49 of anvil 48 which is of upwardly extending progressively decreasing diameter. Nickel ribbon 42 is assembled in the thermocouple by sandwiching the ribbon between mica sheets 51 held between the two parts of anvil 48 as shown in Fig. 4. The protuberance 49 of anvil 48 is then forcefully driven into the lower portion 47 of opening 43 in housing 39, and, when firmly seated the protuberance 49, is cut flush with the lower bore surface of housing 39 and slowly ground across the housing bore surface such that the thermocouple metals are mixed together. As afore-mentioned, we refer to the junction formed in this way as a "ground weld." In this manner the "hot" junction of the thermocouple is completed. The nickel ribbon 42 is contained through opening 43 in spaced relationship with the inner wall of housing 39 by tensioning the ribbon between the fixed ends thereof. Screw 52 is engaged through passage 46 of insulating plug 45 and is provided with a longitudinal split 53 into which ribbon 42 is continued. By the provision of insulated plug 45 and split screw 52 electrical insulation between the housing metal and the nickel is achieved as well as a means by which ribbon 42 may be tensioned within opening 43 to be spaced apart from the interior walls of housing 39. The head of split screw 52 may be positioned at an elevation which is above that of the radial slot 54 in the hexagonal head 55 of housing 39 in order that a lead 56 may be passed therethrough to electrically and mechanically couple with ribbon 42 at screw 52. Screws 57 are threaded into tapped opening in hexagonal head 55 of housing 39 to serve as electrical terminals for the steel of the housing. A suitable lead, such as copper wire 58 may be attached to either of the terminal screws 57 and thus the two leads 56 and 58 may connect recording instruments in circuit with the thermocouple.

The lower cylindrical portion 59 of housing 39 may be provided with suitable gas seals mounted thereon such as soft steel ring 61 for effectively sealing the area between the housing and the gun barrel. It is readily apparent that the barrel openings into which the housing of Fig. 1 and Fig. 3 are passed conform with the contour of the exterior of the thermocouple and are threaded in both instances in the uppermost large diameter section only.

The present invention is constructed such that both the metallic elements comprising the thermocouple have thermal conductivity characteristics similar to that of the gun barrel under test to produce highly accurate temperature recordings of the bore surface temperatures. The sensing tip at the bore surface of each thermocouple is constructed of divisible parts which may be closely assembled to carry therebetween one of the metals forming the thermocouple and, when assembled in the thermocouple, allows the thermocouple to withstand high pressure and thermal forces evidenced in the bore of large caliber guns. Substitution of nickel wire for the nickel ribbon of the present invention, or welding of wire chemically similar to the nickel ribbon at various points of the thermocouple to replace the frail ribbon has been found desirable in some instances.

Obviously, many modifications and variations of the present invention are possible in the light of the above teachings. It is therefore to be understood that within the scope of the appended claims the invention may be practiced otherwise than as specifically described.

What is claimed is:

1. In a system for measuring the bore surface temperature of a gun barrel including a gun barrel having a wall provided with a transverse passage therethrough, the combination in mating relationship with said barrel passage of a thermocouple comprising a housing, a first means mounted within said housing of such a construction as to extend from the lower portion thereof, a second means carried by said first means formed to extend through the upper portion of said housing and arranged to form a ground weld thermocouple junction with the first means at the lowermost portion thereof, and thermoelectric insulating means positioned between said second means and said first means in a manner to provide a thermocouple, and electromotive force leads from the thermocouple junction to the barrel exterior, said leads consisting of said second means and the housing joined with said first means respectively.

2. A bore surface thermocouple comprising a housing for mating with a passage through a gun barrel wall communicating the bore with the ambient temperature barrel exterior, a split solid metallic cylinder mounted within said housing of such a construction to extend from the lower portion thereof, means carried by said cylinder formed to extend through the upper portion of said housing and arranged to form a ground weld thermocouple junction with the cylinder across the lowermost surface thereof, and thermoelectric insulating means positioned between said first-named means and said split cylinder separating said first-named means from said cylinder except at said junction, electromotive force leads from the thermocouple junction to the barrel exterior, said leads consisting of said first-named means and the housing joined with said split cylinder respectively.

3. A bore surface thermocouple comprising a housing for mating with a passage through a gun barrel wall communicating the bore with the ambient temperature barrel exterior, a split solid metallic cylinder mounted within said housing of such a construction to extend from the lower portion thereof, a metallic ribbon carried by said cylinder formed to extend through the upper portion of said housing and arranged to form a ground weld thermocouple junction with the metallic cylinder at the lowermost portion thereof, and thermoelectric insulating means positioned between said ribbon and said cylinder separating said ribbon from said cylinder except at said junction, electromotive force leads from the thermocouple junction to the barrel exterior consisting of said ribbon, and the housing joined with said split cylinder.

4. A bore surface thermocouple comprising a housing for location within a passage through a gun barrel wall communicating the bore with the ambient temperature barrel exterior, a split solid metallic cylinder mounted within said housing of such a construction to extend from the lower portion thereof, a metallic ribbon carried by said cylinder formed to extend through the upper portion of said housing and arranged to form a ground weld thermocouple junction with the metallic cylinder at the lowermost portion of said cylinder and of said ribbon, and laminae of thermoelectric insulation positioned between said ribbon and said cylinder separating said ribbon from said cylinder except at said junction, electromotive force leads from the thermocouple junction to the barrel exterior consisting of said ribbon, and the housing joined with said split cylinder.

5. A bore surface thermocouple comprising a housing for mating with a passage through a gun barrel wall communicating the bore with the ambient temperature barrel exterior, a split solid metallic cylinder mounted within said housing of such a construction to extend from the lower portion thereof, a steel ring circumscribing a lower portion of said split cylinder to firmly fix the split cylinder in assembled relationship, a circumferential gas seal frictionally positioned on said cylinder in such a manner to wedge between said cylinder and said barrel passage to effect a gas seal between the thermocouple junction and the bore of the gun barrel, a seating gasket arranged between said housing and said cylinder at the point of entry of said cylinder into said housing, a metallic ribbon carried by said cylinder formed to extend through the upper portion of said housing and arranged to form a thermocouple junction with the metallic cylinder at the lowermost portion of said cylinder and of said ribbon, laminae of mica positioned between said ribbon and said cylinder separating said ribbon from said cylinder except at said junction, said thermocouple junction being formed by grinding across said lowermost portion of said ribbon and of said split cylinder and of said laminae of mica positioned therebetween, an electromotive force lead from the thermocouple junction to the barrel exterior consisting of said ribbon, and the housing and said split cylinder forming a second electromotive force lead, an insulating cap mounted on the uppermost portion of said housing, and terminals carried by the insulating cap to electrically couple the said housing and the said ribbon to electrical indicating circuitry for recordation of bore surface temperature.

6. A bore surface thermocouple comprising a housing receivable into a transverse passage provided through the wall of a gun barrel to communicate the barrel exterior with the bore, said housing being provided with a central opening extending coaxially therethrough with progressively decreasing diameter from the upper portion of the housing to the lower portion, a first insulating means mounted within the uppermost portion of said diameter and provided with a longitudinally extending central opening, a circumferential gas seal frictionally surrounding the lower exterior of said housing to effect a gas tight fit between the lower exterior of the housing and the passage extending through the gun barrel wall, the taper diameter at the lowermost portion of said central opening within said housing being downwardly progressively increasing, split tapered means formed to be received into the opening within the housing at the lowermost portion and shaped to frictionally mate with the downwardly progressively increasing diameter portion thereof, electrically conductive means held between said split tapered means and arranged to form a ground weld thermocouple junction with said split tapered means at the lower end of the housing, a second insulating means held between said split tapered means and surrounding said electrically conductive means, said conductive means extending upwardly through the aperture of said housing such that passage of the electromotive force generated at the thermocouple junction is made through the housing and the electrically conductive means respectively.

7. A bore surface thermocouple as defined in claim 6 wherein said split tapered means comprises a longitudinally-divided truncated cone which is tapered to mate with the outwardly increasing diameter of the lowermost portion of the opening within the housing.

8. The apparatus of claim 7 wherein said electrically conductive means consists of a metallic ribbon.

9. The apparatus of claim 8 wherein said second insulating means consists of laminae of mica.

10. A method of forming a thermojunction between metallic elements of a thermocouple having insulation therebetween, comprising grinding across a surface common to said metallic elements whereby said insulation is removed at said surface and portions of said metallic elements are deformed by said grinding to flow and mix together at said surface.

11. A bore surface thermocouple comprising a housing receivable into a transverse passage provided through the wall of a gun barrel to communicate the barrel exterior with the bore, said housing being provided with a central opening extending coaxially therethrough with progressively decreasing diameter from the upper portion of the housing to the lower portion, the tapered diameter at the lowermost portion of said central opening within said housing being downwardly progressively increasing, split tapered means formed to be received into the opening within the housing at the lowermost portion and shaped to frictionally mate with the downwardly progressively increasing diameter portion thereof, electrically conductive means held between said split tapered means and arranged to form a ground weld thermocouple junction with said split tapered means at the lower end of the housing, insulating means held between said split tapered means and surrounding said electrically conductive means, said conductive means extending upwardly through the aperture of said housing such that passage of the electromotive force generated at the thermocouple junction is made through the housing and the electrically conductive means respectively.

12. In a system for measuring the bore surface temperature of a gun barrel including a gun barrel having a wall provided with a transverse passage therethrough, the combination in mating relationship with said barrel passage of a thermocouple comprising a housing, a first means mounted within said housing of such a construction to extend from the lower portion thereof, a second means comprising a metallic ribbon flat along at least the lower portion thereof and carried by said first means and formed to extend through the upper portion of said housing and arranged to form a ground weld thermocouple junction with the first means at the lowermost portion thereof, and thermoelectric insulating means positioned between said second means and said first means in a manner to provide a thermocouple, and electromotive force leads from the thermocouple junction to the barrel exterior, said leads consisting of said second means and the housing joined with said first means respectively.

References Cited in the file of this patent

UNITED STATES PATENTS

| | | |
|---|---|---|
| 1,847,059 | Beshara | Feb. 24, 1932 |
| 2,202,533 | Mason | May 28, 1940 |
| 2,258,809 | Rabezzana | Oct. 14, 1941 |
| 2,380,741 | Fisher | July 31, 1945 |
| 2,419,056 | Burton | Apr. 15, 1947 |
| 2,625,573 | Connell | Jan. 13, 1953 |

FOREIGN PATENTS

| | | |
|---|---|---|
| 275,016 | Great Britain | Aug. 4, 1927 |
| 242,847 | Germany | June 11, 1911 |

OTHER REFERENCES

Publication: "Measurement of Gun Barrel Temperatures," Instruments and Automation V28, pages 106–108, January 1955.